United States Patent [19]
Fleischer

[11] 4,113,285
[45] Sep. 12, 1978

[54] CLAMPING DEVICE

[76] Inventor: Henry Fleischer, 18 Notch Park Rd., Little Falls, N.J. 07424

[21] Appl. No.: 819,819

[22] Filed: Jul. 28, 1977

Related U.S. Application Data

[60] Division of Ser. No. 658,582, Feb. 17, 1976, Pat. No. 4,062,573, which is a division of Ser. No. 479,667, Jun. 17, 1974, abandoned, which is a continuation-in-part of Ser. No. 427,149, Dec. 21, 1973, abandoned.

[51] Int. Cl.² .............................................. F16L 33/22
[52] U.S. Cl. ...................................... 285/45; 285/243
[58] Field of Search .................. 285/243, 322, 45, 316

[56] References Cited
U.S. PATENT DOCUMENTS

| 940,678 | 11/1909 | Doane et al. ................ 285/370 X |
|---|---|---|
| 1,081,963 | 12/1913 | Holloway ............................. 285/45 |
| 1,841,009 | 1/1932 | Cantell ................................. 285/45 |
| 1,857,528 | 5/1932 | Cantell ................................. 285/45 |
| 3,724,882 | 4/1973 | Dehar ................................. 285/243 |

FOREIGN PATENT DOCUMENTS 460,508 10/1913 France ..................................... 285/243

Primary Examiner—Thomas F. Callaghan

[57] ABSTRACT

There is provided a clamping member for attaching one part of a two part coupling device to a conduit, such as a hose, said clamping member comprising a body section having a bore running therethrough and comprising a first end portion, an intermediate portion and a second end portion, said first end portion being adapted to be connected to one part of the two part hose coupling device. The clamping member further includes at least a pair of spaced apart clamping rods each of which is pivotally connected to the body section of the clamping member, each of said clamping rods including a clamp section connected at one end of said rod, and an annular ring disposed about said body section in contact with said clamping rods, so that when a hose is inserted in the second end portion of the body section, the annular ring member can be positioned so as to bear against the connecting rods and force the connecting rods to be pivoted downwardly so that the clamp section thereof will be forced against the hose and thereby hold the hose in said body section.

5 Claims, 8 Drawing Figures

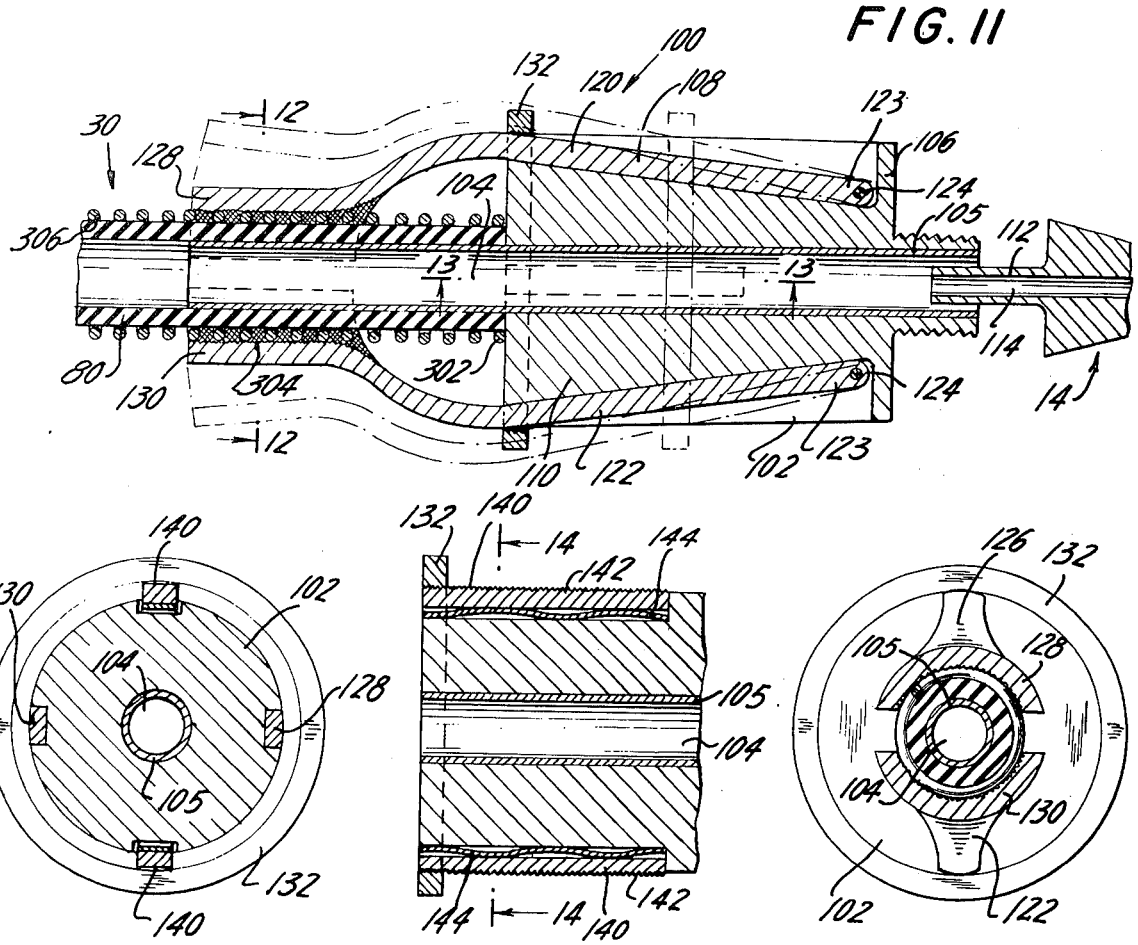
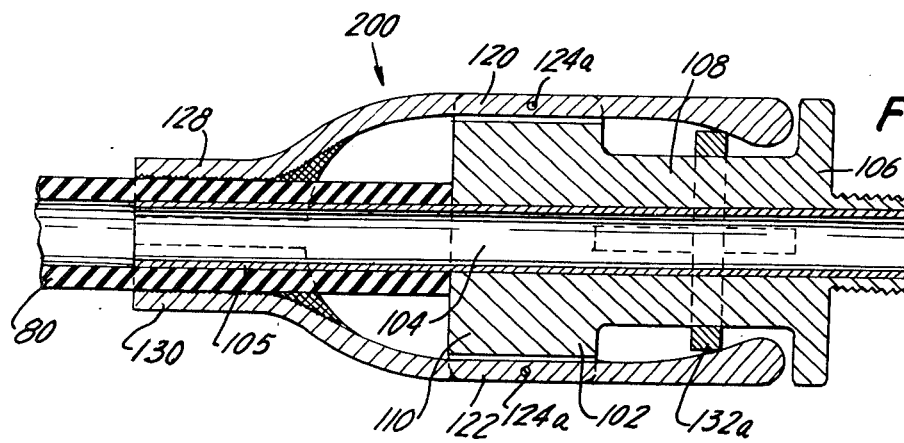

CLAMPING DEVICE

REFERENCE TO OTHER APPLICATIONS

This application is a Divisional application of application Ser. No. 658,582 filed Feb. 17, 1976, now U.S. Pat. No. 4,062,573, which is a Divisional application of application Ser. No. 479,667, filed June 17, 1974, now abandoned which is a Continuation-In-Part of application Ser. No. 427,149 filed Dec. 21, 1973, now abandoned.

FIELD OF THE INVENTION

The present invention relates to a clamping member which can be employed to connect one part of a two part coupling device to a hose, such connection and/or subsequent disconnection being effected manually without the need for employing tools.

BRIEF STATEMENT OF THE INVENTION

The present invention provides a clamping member for attaching one part of a two part hose coupling device such as described in application Ser. No. 479,667 filed June 17, 1974 and the continuation-in-part thereof, such as the socket member or the plug member, to a hose. The clamping member comprises a body section having a bore running therethrough and includes a first end portion, an intermediate portion and a second end portion, the first end portion being adapted to be connected to one part of the two part coupling device. Said one part of the coupling device including a tubular end portion having a bore running therethrough, such as a conventional nipple. The clamping member will also include at least a pair of spaced apart clamping rods, each of which is pivotally connected to the body section of the clamping member, each of said clamping rods including a clamp section connected at one end thereof. An annular ring member is disposed about the body portion of the clamping member in contact with the clamping rods, so that when a hose is inserted in the second end portion of the body section, the annular ring member can be positioned so as to force the connecting rods to be pivoted downwardly so that the clamp sections thereof will be forced against the hose and thereby hold the hose in place in the body portion and in communication with the one part of the coupling device. The unique clamping members as described above will allow attachment of the components of the coupling device to conduit sections, such as to two hoses, by hand, without the need for employing wrenches or other tools. Furthermore, the unique clamping members may include a protective cover or sleeve which protects these devices from the impact received upon dropping the same on hard surfaces.

BRIEF DESCRIPTION OF THE FIGURES

FIG. 1 is a view of a clamping member;

DETAILED DESCRIPTION OF PREFERRED EMBODIMENTS

Figure 2:
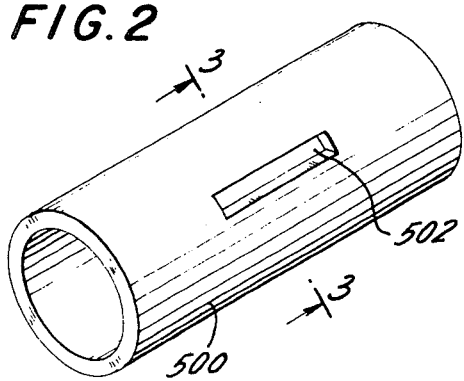
FIG. 2 is a perspective view of a protective cover or sleeve in accordance with the invention.

Referring now to the accompanying Figures wherein like parts are represented by like numerals in the several views, in FIG. 1, a clamping member is shown and is identified generally by the numeral 200. The clamping member 200 is employed for attaching one part of a two part coupling device 10 described in application Ser. No. 479,677, filed June 17, 1974, such as for example, the plug member or the socket member, to a hose section 80. The clamping member 200 comprises a body section 102 having a bore 104 running therethrough defined by inner walls of the body section 102. The body section 102 comprises a first end portion 106, an intermediate portion 108 and a second end portion 110. The first end portion 106 is adapted to be connected to the one part of the two part coupling device, such as the second end portion of the plug member. Disposed within the bore 104 is inner sleeve 105 which aids in securing a hose to the clamping member as will be described hereinafter.

The second end portion of the plug member will include a nipple or tubular extension which is adapted to be seated in and extend into the bore 104 and sleeve 105 of the body section 102. It will be appreciated that the nipple of the plug member will have a bore which communicates with the bore 104 of the body section when the nipple of the plug member is seated in the body section 102.

The clamping member will include at least a pair of spaced apart clamping rods 120, 122 each of said rods being pivotally connected at one end portion (123) thereof to the body section of the clamping member by means of pivot pins 124*a* as shown. The other end of the clamping rods 120, 122 will include clamp sections 128, 130, respectively, which are adapted to be pressed against the surface of the hose section 80. The clamp sections 128, 130 will preferably include gripping surfaces, such as ribbed inner surfaces to aid in gripping of the hose section.

The clamping rods 120 and 122 will preferably be positioned on the body portion 102 of the clamping member 100 so that the clamp sections 128, 130 are disposed oppositely with respect to each other and are in contact with opposite surfaces of the hose section 80, when the clamp sections are in their closed position. It is preferred that the clamp sections 128, 130 are formed with a slight curvature or arc so that they can be positioned about substantially any diametered hose in a manner such that the clamp sections will not ordinarily contact each other when in their closed position.

The clamping rods 120, 122, in this embodiment, are pivotally connected to the body portion 102 of the clamping member 200 so that the connecting rods 120 and 122 pivot via pivot pins 124*a* at an intermediate point thereof about the body section 102. Ring member 132*a* (510 in FIG. 4) is disposed about the body section 102 and beneath the connecting rods 120, 122, preferably at a point or location near the back end or end of the connecting rods away from the clamp sections 128, 130 as shown in FIG. 1. The rear portion of the clamping rods 120, 122 in this embodiment will be inclined, as shown. Thus, when it is desired to close the clamp sections 128, 130 about a hose section 80, the ring member 132a (510 in FIG. 4) will be moved backwardly, for example, towards the plug member to cause the connecting rods, 120, 122 to pivot toward the hose section 80 and to cause the clamp sections 128, 130 to be pressed against the hose section 80. When it is desired to open the clamp sections 128, 130, so as to release the hose section 80, the ring member 132a will be moved toward the clamp sections 128, 130 thereby causing the clamping rods 120, 122 to be moved away from the hose section 80 and thereby carrying the clamp sections 128, 130 away from said hose section.

Figure 3:
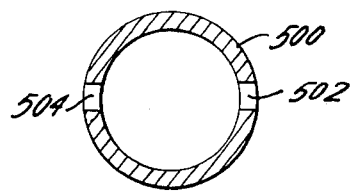
FIG. 3 is a cross-sectional view of the protective cover taken along lines 2—2 of FIG. 2.
Figure 4:
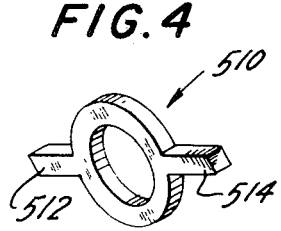
FIG. 4 is a perspective view of a ring member having a pair of extending pins employed in conjunction with the protective cover of FIG. 2.
Figure 5:
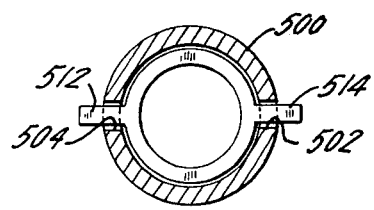
FIG. 5 is a cross-sectional view of the ring member of FIG. 4 seated in the protective cover of the invention.
Figure 6:
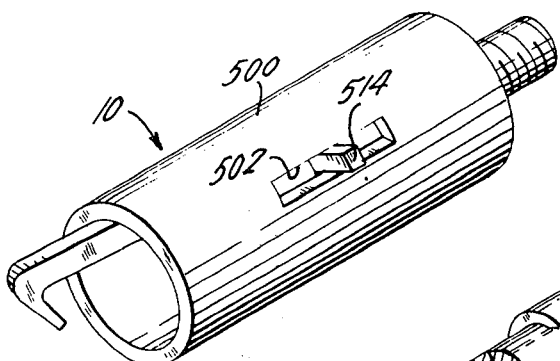
FIG. 6 is a schematic view of the protective cover and ring member employed in conjunction with a portion of a coupling device as shown in FIG. 1 of application Ser. No. 479,667, filed June 17, 1974.

In a further embodiment of the present invention, the clamping member of the invention may include a protective cover or sleeve. When the clamping member or even a coupling device as disclosed in parent application Ser. No. 479,667, which includes said protective cover, is dropped or is subjected to a heavy blow or impact, the protective cover will absorb such blow or impact and thereby cushion the coupling device or clamp member and prevent damage thereto. As shown in FIG. 2, the protective cover of the invention comprises a tubular member 500 which includes one and preferably two elongated slots 502, 504 (see FIG. 3). The ring member whether it be the ring member for the coupling device 10 or the clamping member 200 is shown in FIG. 4 and is identified by the numeral 510. The ring member will include a pair of projections 512, 514, as shown. As seen in FIG. 5, the ring member 510 is adapted to be disposed within the protective cover 500 in a manner such that the projections 512, 514 of the ring member extend through the slots 504, 502, respectively, of the protective cover 500. In this manner, the projections of the ring member may be gripped so as to move the ring member within the protective cover and in the slots 502, 504. Thus, where the protective cover and ring member are employed in a coupling device 10, as shown in FIG. 6, the projections 512 and 514 (only projection 514 being shown) will extend through the protective cover 500. In this manner, the coupling device can be operated by merely moving the ring member, by grasping the projections 512, 514, in the slots 504, 502, of the protective cover 500 thereby opening or closing the coupling device.

Figure 7:
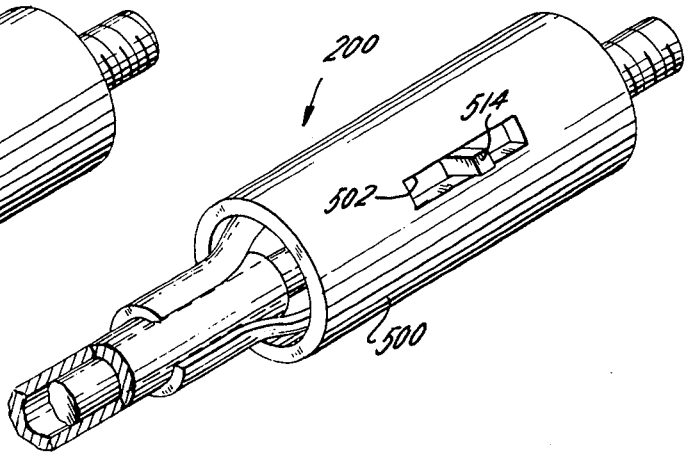
FIG. 7 is a schematic view of the protective cover and ring member employed in conjunction with the clamping member shown in FIG. 15.

Furthermore, where the protective cover 500 is employed in the clamping member 200 of the invention, as shown in FIG. 7, the projections of the ring member will extend through the slots of the protective cover. Thus, when it is desired to close the clamping member about the hose, the projections may be grasped so as to move the ring member by moving the projections along the slots.

Figure 8:
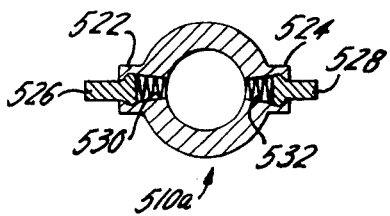
FIG. 8 is a schematic view of an alternate embodiment of the ring member employed in the protective cover of the invention.

As shown in FIG. 8, the ring member 510a may comprise an annular body 520 having extensions 522 and 524 which have openings which are adapted to receive lugs or pins 526 and 528, respectively. The lugs are connected to and biased by biasing means, such as springs 530 and 532, respectively, said springs being connected to the body 520. The ring member 510a may be employed in conjunction with the protective cover 500 shown in FIGS. 2, 3 and 5. In this embodiment, when the lugs are subjected to a heavy blow, they will be moved into the openings in the extension 522, 524 and thereby avoid being damaged.

It will be appreciated that the protective cover as shown in FIGS. 2 to 8 may be employed in conjunction with any type of coupling device or clamping member. Furthermore, the projections 512, 514, as shown may be directly attached to any other movable member of such a coupling device or clamping member, which movable member is adapted to open or close the coupling device or clamping member.

What is claimed is:

1. A clamping member for attaching one part of a two part hose coupling device to a hose, comprising, in combination, a body section having a bore running therethrough, and comprising a first end portion, an intermediate portion and a second end portion, said first end portion being adapted to be connected to one part of a two part hose coupling device; at least a pair of spaced apart clamping rods each pivotally connected to said body section of said clamping member, each of said clamping rods including a clamp section connected at one end of said rod; rod moving means comprising a ring member disposed about said body section in contact with said clamping rods and which moves axially with respect to said body section and said clamping rods, said rod moving means further including at least a pair of spaced apart projections extending therefrom, a protective cover having at least a pair of spaced apart elongated slots which extend axially of said cover, said cover being disposed over said body portion of said clamping member in a manner such that said projections of said rod moving means protrude through said slots, and further including an inner sleeve member disposed within said bore of said body section of said clamping member, in a manner such that when a hose section is fitted within said clamping member, a portion of said hose is disposed over at least a portion of said inner sleeve member and said rod moving means can be positioned so as to force said connecting rods to be pivoted downwardly so that the clamp sections thereof will be forced against said hose and thereby hold said hose in place in said body section and in communication with said one part of said coupling device.

2. The clamping member in accordance with claim 1 wherein said clamping rods are positioned opposite each other on said body section so that said clamp sections are in contact with opposite surfaces of said hose.

3. The clamping member in accordance with claim 1 wherein said clamp sections are spaced from each other when disposed in contact with said hose.

4. The clamping member in accordance with claim 1 further including ring retaining means in communication with said ring member.

5. The clamping member in accordance with claim 1 wherein said spaced apart projections of said rod moving means are spring-biased.

* * * * *

UNITED STATES PATENT AND TRADEMARK OFFICE
CERTIFICATE OF CORRECTION

PATENT NO. : 4,113,285
DATED : September 12, 1978
INVENTOR(S) : Henry Fleischer

It is certified that error appears in the above-identified patent and that said Letters Patent are hereby corrected as shown below:

Figures 11, 12, 13 and 14 should be deleted.

Column 2, line 5, "15" should be - - 1 - -.

Signed and Sealed this

Nineteenth Day of December 1978

[SEAL]

Attest:

RUTH C. MASON
Attesting Officer

DONALD W. BANNER
Commissioner of Patents and Trademarks